United States Patent [19]

Kasahara et al.

[11] Patent Number: 5,198,171

[45] Date of Patent: Mar. 30, 1993

[54] PROCESS FOR CONTINUOUSLY PRODUCING HEAT-VULCANIZABLE SILICONE RUBBER COMPOUND

[75] Inventors: Yutaka Kasahara; Hironori Amano; Shigeru Wada; Junichiro Watanabe, all of Gunma, Japan

[73] Assignee: Toshiba Silicone Co., Ltd., Tokyo, Japan

[21] Appl. No.: 864,134

[22] Filed: Apr. 6, 1992

Related U.S. Application Data

[63] Continuation of Ser. No. 672,755, Mar. 22, 1991, which is a continuation of Ser. No. 418,610, Oct. 10, 1989, abandoned.

[30] Foreign Application Priority Data

Oct. 11, 1988 [JP] Japan .................. 63-255382

[51] Int. Cl.⁵ .............................................. B29B 7/48
[52] U.S. Cl. ............................ 264/211.23; 264/142; 264/143; 264/210.6; 264/349; 264/211; 366/83; 366/91; 425/204; 425/205; 425/208; 524/730
[58] Field of Search ............... 264/141, 142, 211.23, 264/211.24, 211, 349, 109, 122, 143, 210.6; 425/204, 205, 208, 378.1; 366/76, 83, 91; 524/730, 588, 862; 528/10

[56] References Cited

U.S. PATENT DOCUMENTS

| | | |
|---|---|---|
| 2,286,405 | 6/1942 | Gordon . |
| 3,824,208 | 7/1974 | Link et al. . |
| 3,951,389 | 4/1976 | Porter ........................ 366/91 |
| 3,960,804 | 6/1976 | Minuto . |
| 4,034,140 | 7/1977 | Przybyla . |
| 4,117,073 | 9/1978 | Koch et al. ................ 425/208 |
| 4,279,790 | 7/1981 | Nakajima ................... 264/122 |
| 4,358,550 | 11/1982 | Jacono et al. . |
| 4,446,090 | 5/1984 | Lovgren et al. . |
| 4,500,659 | 2/1985 | Kroupa et al. . |
| 4,585,830 | 4/1986 | Sweet . |
| 4,814,376 | 3/1989 | Tanaka et al. . |

FOREIGN PATENT DOCUMENTS 1219752 1/1971 United Kingdom .
2110981 6/1983 United Kingdom .

Primary Examiner—Jeffery Thurlow
Assistant Examiner—Mathieu Vargot
Attorney, Agent, or Firm—Sughrue, Mion, Zinn, Macpeak & Seas

[57] ABSTRACT

A process for continuously producing a heat-vulcanizable silicone rubber compound, which includes the steps of:

(i) mixing (A) a diorganopolysiloxane having a viscosity as measured at 25° C. of $1 \times 10^5$ cP or more, (B) an inorganic filler and (C) a processing aid, as basic ingredients, by a high-speed mechanical shearing machine, thereby to obtain a flowable particulate mixture in which each ingredient is present in a substantially uniformly and finely dispersed state, and (ii) continuously feeding, at a constant feed rate, said particulate mixture to a continuously kneading and extruding machine through a feed opening thereof, which machine has two screws rotating in the same direction, thereby to obtain a homogeneous silicone rubber compound from a discharge opening of said kneading and extruding machine.

30 Claims, 1 Drawing Sheet

1

PROCESS FOR CONTINUOUSLY PRODUCING HEAT-VULCANIZABLE SILICONE RUBBER COMPOUND

This is a continuation of application No. 07/672,755 filed on Mar. 22, 1991, which is a continuation of prior application No. 07/418,610 filed Oct. 10, 1989 (now abandoned).

FIELD OF THE INVENTION

This invention relates to a process for continuously producing a heat-vulcanizable silicone rubber compound. More particularly, the present invention relates to an efficient process for continuously producing a homogeneous silicone rubber compound, which comprises mixing basic structural ingredients for a heat-vulcanizable silicone rubber compound by means of high-speed mechanical shearing to form a flowable particulate mixture, and then introducing the flowable particulate mixture into a same direction-rotating twin-screw continuous kneading and extruding machine (hereinafter referred to as "same-direction twin-screw extruder") through the feed opening of the machine.

BACKGROUND OF THE INVENTION

A heat-vulcanizable silicone rubber compound is a base compound comprising a high-viscosity diorganopolysiloxane (gum) as the primary ingredient and, blended therewith, a silica type reinforcing filler and various additives for imparting various desired properties to the compound. From this compound, final formed products of silicone rubber are manufactured usually by rubber processors, and this process comprises blending a vulcanizing agent with the compound and then heat-curing the resulting compound. As such vulcanizing agents, conventional vulcanizing agents such as organic peroxides and addition reaction-type crosslinking agents composed of a combination of an organohydrogen polysiloxane and a platinum compound are used.

Conventional method for the production of such heat-vulcanizable silicone rubber compounds is to uniformly knead a high-viscosity diorganopolysiloxane gum, an inorganic filler and various additives by means of a kneading machine such as a twin-arm kneader (dough mixer), an internal mixer (Banbury mixer) or a two-roll mill. Of such apparatuses, kneaders are most frequently employed. The dough mixer comprises a large tank equipped therein with two large mixing blades which knead the gum and the filler into a homogeneous mixture (compound). In some cases, the above kneading is conducted under heating for the purpose of diminishing the crepe hardening (plasticization reverse) of the compound produced with passage of time. Therefore, the time necessary for a kneader having a capacity of 2 tons to produce such a compound is from a minimum of 6 hours to a maximum of as much as 48 hours. In addition, the thus-obtained compound mass is forced to pass through a filtering extruder to remove foreign particles which have come into the mass, thereby giving a final compound.

Thus, the generally employed process for the production of heat-vulcanizable silicone rubber compounds requires large-sized equipments and much time. Therefore, in order to eliminate these disadvantages, efficient and continuous processes have so far been proposed.

For example, JP-A-61-40327 discloses a process for producing a liquid silicone rubber base by kneading an organopolysiloxane and an inorganic filler, as main ingredients, by means of a twin-screw continuous extruder. (The term "JP-A" as used herein means an "unexamined published Japanese patent application".) The organopolysiloxane preferably used in the above process has a specific viscosity range of from 300 to 30,000 cP at 25° C. and shows a good flowability, so that it has excellent compatibility with inorganic fillers. Therefore, due to its low viscosity, the organopolysiloxane can be easily blended with fillers and other additives introduced into a liquid silicone rubber base using only one twin-screw extruder. However, if an organopolysiloxane having a viscosity higher than $1 \times 10^5$ cP at 25° C. is used and the kneading of the organopolysiloxane with an inorganic filler, particularly with reinforcing silica having a specific surface area of 50 m²/g more, is conducted by means of a twin-screw extruder only, much time is often required to obtain a uniform mixture or the composition of the rubber base varies with part and a rubber base having poor quality is only obtained. Thus, a process for producing a silicone rubber base from a high-viscosity organopolysiloxane by means of a twin-screw extruder has not yet been put to practical use.

With respect to heat-vulcanizable silica rubber mixtures, JP-A-50-25650 discloses a process for producing a heat-vulcanizable silicone rubber mixture from a high-viscosity organopolysiloxane as a main ingredient. More particularly, this process is to produce, in a short time, a free-flowing particulate silicone rubber mixture from an organopolysiloxane having a viscosity of from $1 \times 10^5$ to $2 \times 10^8$ cP at 25° C. and a filler selected from reinforcing fillers, extending fillers and mixtures thereof, by a mechanical shearing means using high-speed agitating blades. However, the particulate mixture obtained by this process is defective in long-term stability (storage stability). Illustratively stated, if the particulate mixture is allowed to stand at room temperature for a long period of time, particles thereof adhere to each other to impair the flowability of the mixture, or inversely the particulate composition forms a structure (crepe hardening) and becomes rubbery, so that it cannot be plasticized with rolls. Because of these defects, this silicone rubber mixture has a very limited application range as a heat-vulcanizable silicone rubber composition.

The particulate silicone rubber mixture prepared by the above prior art process is advantageous in that if the silicone rubber mixture already contains a vulcanizing agent and is prepared just before, the mixture can be directly vulcanized in an injection molder or an extruder to give a silicone rubber. However, if the particulate silicone rubber mixture contains no vulcanizing agent, the particulate mixture should first be formed into a mass by means of rolls or the like, a vulcanizing agent is added to the mass and a silicone rubber is then formed therefrom. In this case, the step of forming the particulate mixture into a mass is disadvantageous in that the step is not easy and requires much time. Thus, the above process is not always efficient.

SUMMARY OF THE INVENTION

As a result of extensive investigations to develop an efficient process which overcomes the prior art problems, it has been found that a heat-vulcanizable silicone rubber compound which is comparable or superior in filler dispersion to those obtained by prior art processes can be efficiently obtained by forming beforehand a substantially homogeneous particulate composition comprising basic ingredients for a heat-vulcanizable silicone rubber, and then continuously introducing the particulate composition into a same-direction twin-screw extruder. The present invention has been made based on this finding.

Accordingly, an object of the present invention is to provide a process for continuously producing a heat-vulcanizable silicone rubber compound, which can continuously and efficiently produce in a short time a heat-vulcanizable silicone rubber compound having good long-term stability, thereby eliminating the above-described disadvantages of the prior art methods.

The process for continuously producing a heat-vulcanizable silicone rubber compound according to the present invention comprises the steps of:

(i) mixing (A) a diorganopolysiloxane having a viscosity as measured at 25° C. of $1 \times 10^5$ cP or more, (B) an inorganic filler and (C) a processing aid, as basic ingredients, by a high-speed mechanical shearing means, thereby to obtain a flowable particulate mixture in which each ingredient is present in a substantially uniformly and finely dispersed state, and (ii) continuously feeding, at a constant feed rate, the particulate mixture to a continuously kneading and extruding machine through a feed opening thereof, which machine has two screws rotating in the same direction, thereby to obtain a homogeneous silicone rubber compound from a discharge opening of the kneading and extruding machine.

BRIEF DESCRIPTION OF THE DRAWING

The FIG. 1 is a flow diagram of an apparatus for carrying out one embodiment of the process of this invention.

DETAILED DESCRIPTION OF THE INVENTION

The diorganopolysiloxane (A) which can be used in the present invention is a material which is conventionally used the above kind and has a viscosity as measured at 25° C. of $1 \times 10^5$ cP or higher, preferably from $1 \times 10^6$ to $2 \times 10^8$ cP. If the viscosity is below $1 \times 10^5$ cP, such a diorganopolysiloxane is disadvantageous in that a heat-vulcanizable silicone rubber compound to be obtained therefrom is hard to process and vulcanized products to be obtained from the rubber compound are poor in mechanical strength. On the other hand, a diorganopolysiloxane having a viscosity higher than $2 \times 10^8$ cP is also not preferred in that addition of inorganic fillers is difficult and, further, the long-term stability (storage stability) of the resulting compound is poor.

Such a diorganopolysiloxane is a known, substantially linear polymer represented by the formula $R^2(R^1_2SiO)_nSiR^1_2R^2$ (wherein $R^1$ represents a substituted or unsubstituted monovalent hydrocarbon group, provided that 0 to 1.0% of the hydrocarbon groups of $R^1$ are vinyl; $R^2$ is a monovalent group selected from the group consisting of a methyl group a vinyl group, a phenyl group and a hydroxyl group; and n is a number of from 1,000 to 10,000). Examples of the hydrocarbon group of $R^1$ other than vinyl include alkyl groups (such as methyl, ethyl, propyl, butyl, hexyl, octyl, decyl and dodecyl), cycloalkyl groups (such as cyclopentyl and cyclohexyl), aralkyl groups (such as 2-phenylethyl and 2-phenylpropyl), aryl groups (such as phenyl and tolyl), alkenyl groups (such as allyl, cyclopentenyl and cyclohexenyl) and substituted hydrocarbon groups (such as chloromethyl, chlorophenyl and 3,3,3-trifluoropropyl). It is preferred that 50% or more of all the hydrocarbon groups of $R^1$ are methyl, from the standpoint of the heat resistance and other properties of silicone rubbers to be produced. Further, in the case where all the hydrocarbon groups of $R^1$ are not vinyl, $R^2$ should be vinyl. In the case where $R^2$ is not vinyl, at least two vinyl groups per molecule should be present. If the number of vinyl groups contained in the diorganopolysiloxane is smaller than two per molecule, the vulcanization of a silicone rubber compound to be obtained therefrom cannot proceed sufficiently. Furthermore, more than 1.0% of the hydrocarbon groups of $R^1$ may be vinyl, but such a diorganopolysiloxane is undesirable since the resulting silicone rubber compound gives vulcanized silicone rubbers which are poor in heat resistance and, because of their too high crosslinking densities, which show poor mechanical strengths. In practicing the present invention, it is possible to blend diorganopolysiloxanes having different vinyl group contents such that the vinyl group content in the resulting blend is within the above-specified range.

According to the process of the present invention, good results can be obtained in the case where a diorganopolysiloxane represented by the above formula in which n is in the range of from 1,000 to 10,000, or a diorganopolysiloxane having a viscosity in the above-described range, is used. The substantially linear polymer may contain a partly branched polysiloxane in a possible range.

The inorganic filler (B) which can be used in the present invention may be any of the inorganic fillers for use in blends with silicone rubbers. Examples of such inorganic fillers are a reinforcing silica such as fumed silica or precipitated silica, having a specific surface area exceeding, for example, 50 m$^2$/g, a surface-treated silica which has been treated with an organosilicon compound such as an organopolysiloxane, an organoalkoxysilane, an organochlorosilane or a hexaorganodisilazane, diatomaceous earth, finely crushed quartz, aluminum oxide, titanium oxide, iron oxide, cerium oxide, cerium hydroxide, magnesium oxide, zinc oxide, calcium carbonate, zirconium silicate, carbon black and ultramarine. These inorganic fillers can be used alone or in combination of two or more thereof. The amount of the inorganic filler (B) added is in the range of from 10 to 200 parts by weight, preferably from 10 to 100 parts by weight, per 100 parts by weight of the organopolysiloxane (A). If the amount is below 10 parts by weight, the reinforcing effect of the filler is insufficient. On the other hand, the addition of the filler (B) in an amount exceeding 200 parts by weight is difficult from the processing standpoint.

Of the above-described inorganic fillers, preferred in this invention are reinforcing silicas and surface-treated silicas, which are used alone or in combination. In the case where ingredient (B) is such silica, the amount of the silica added is preferably from 10 to 100 parts by weight, more preferably from 10 to 80 parts by weight, per 100 parts by weight of ingredient (A). If the amount is below 10 parts by weight, sufficient mechanical strengths cannot be imparted to silicone rubbers to be produced, while an amount exceeding 100 parts by weight makes the processing operations difficult.

The processing aid (C) is used in this invention for the purpose of improving the dispersibility of the inorganic filler during the kneading step, reducing the period of time required for the aging of a silicone rubber compound to be obtained, preventing crepe hardening, and regulating the plasticity of the compound, and for other purposes. The processing aid (C) is selected from organosilanes, low-viscosity organopolysiloxanes and silicone resins, which have in their molecules a silanol group and/or an alkoxy group having 1 to 6 carbon atoms. Examples of such organosilanes include diphenyl-silanediol, dimethylsilanediol, methylvinylsilanediol, diphenyldimethoxysilane, dimethyldiethoxysilane, methyltriethoxysilane and phenyltrimethoxysilane. The low-viscosity polysiloxane may contain one or more kinds of organic groups selected from a methyl group, a phenyl group, a vinyl group and a 3,3,3-trifluoropropyl group. The viscosity of the polysiloxane as measured at 25° C. is in the range of from 1 to 300 cP, preferably from 5 to 100 cP. 15 Examples of such a low-viscosity polysiloxane include $\alpha,\omega$-dihydroxypolydimethylsiloxane, $\alpha,\omega$-dimethoxypolydimethylsiloxane, $\alpha,\omega$-dimethoxypolymethylphenylsiloxane, $\alpha,\omega$-diethoxypolymethylvinylsiloxane and $\alpha,\omega$-dimethoxypolymethylvinylphenylsiloxane. A polysiloxane having a viscosity less than 1 cP is not preferred in that it is difficult to obtain silicone rubber compounds of stably good quality because the amount of such a polysiloxane added tends to vary due to its volatility. On the other hand, a polysiloxane having a viscosity higher than 300 cP may be used, but such a polysiloxane is disadvantageous in that the above-described functions cannot be sufficiently exhibited because the content therein of an active group such as a silanol group or an alkoxy group is too low. The silicone resins contain the same organic groups as those contained in the low-viscosity polysiloxane described above or the above-described groups of $R^1$, and the ends of the molecules are terminated with a silanol group and/or an alkoxy group. The silicone resins have a softening point of 150° C. or lower. A silicone resin having a softening point higher than 150° C. is not preferred because it has little effect on the dispersibility of the filler.

The processing aid (C) described above is added in an amount of from 0.1 to 30 parts by weight, preferably from 0.5 to 15 parts by weight, per 100 parts by weight of ingredient (A). If the amount added is less than 0.1 part by weight, no effect is brought about by the addition, while an amount exceeding 30 parts by weight is undesirable because the plasticity of the resulting silicone rubber compound and the mechanical strength of silicone rubbers obtained therefrom are impaired.

In addition to the above-described basic ingredients, various additives known in the art may be added in preparing a heat-vulcanizable silicone rubber compound according to the process of the invention. Examples of such known additives are heat-resistance improvers selected from oxides, hydroxides and fatty acid salts of various metals, vulcanization-reverse inhibitors, flame retarders (platinum compounds), discoloration-preventive agents for vulcanized products such as organohydrogen polysiloxanes, plasticizers such as silicone oil, internal release agents such as metal soaps, pigments and dyes.

In practicing the present invention, the order of the introduction of the above-described ingredients (A) to (C) and other optional ingredients is not particularly limited, but is usually as follows.

Figure 1:
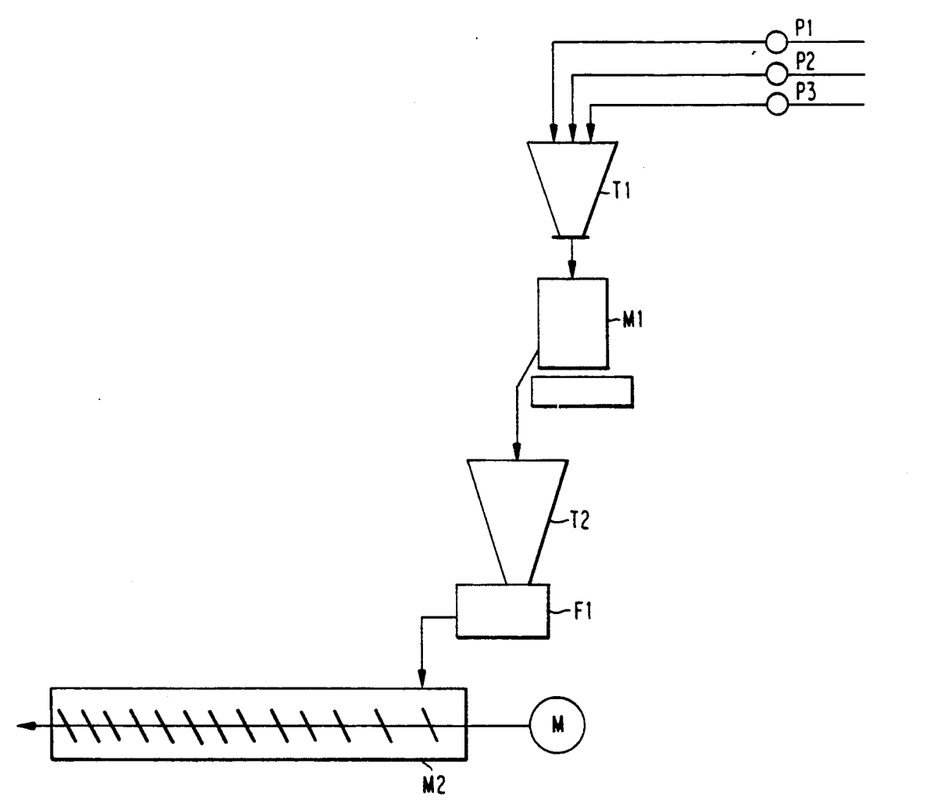

That is, as illustrated in the Figure, ingredients (A) to (C) are fed to a measuring tank Tl by means of feed pumps Pl to P3, respectively. In this feeding, it is preferred that ingredient (B) is introduced beforehand into the measuring tank Tl before ingredients (A) and (C) are introduced, because ingredients (A) and (C) can advantageously be prevented from adhering to the walls of the tank Tl when the ingredients (A) to (C) are subsequently transferred to a high-speed mixer. Further, it is also preferred for the continuous production that ingredient (A) is formed into pellets before being fed to the tank Tl. This can be done by the use of a pump Pl having a discharge part of a special structure. That is, preferably, the discharge opening of the pump Pl is covered with a grating having a large number of holes of 1 to 10 mm in diameter, and the discharge part is further provided with a rotating knife (rotary chopper) such that the ingredient (A) squeezed out in the form of columns through the grating can be cut into pellets. The ingredient (A) thus pelletized by means of this pump Pl is then added to the inorganic filler (B) that has been weighed beforehand as described above in the measuring tank, upon which particles of the filler adhere to the surfaces of the pellets so that the pellets can well maintain their shape and, hence, can be easily transferred to a high-speed mixer. Ingredient (C) is added as it is because it is a liquid or a particulate solid.

The basic ingredients thus weighed are fed to a mixer Ml. The mixer Ml generally used is a mixer which has a mixing blade radius of about 10 to 65 cm and which has been regulated to have a blade speed of 200 to 6,000 rpm, with the peripheral speed of the blades being from 15 to 45 m/sec. The premixing of the ingredients (A), (B) and (C) fed to the mixer is conducted by mechanically applying powerful shearing forces to the ingredients by means of the high-speed rotating blades. In this mixing step, the mixing is stopped when the electric current which is fed to the mixer reaches to a predetermined value, in order to impart flowability to the resulting mixture. The electric current is almost constant at the beginning of the mixing, but then it increases as the filler disperses into the diorganopolysiloxane more uniformly and finely. The electric current soon reaches to the maximum value, and then it decreases as the mixture changes into a mass. If the mixing is continued until the mixture changes into a mass to lose its flowability, the transfer of the mixture for the subsequent step becomes difficult. Therefore, an electric current value which is lower than the maximum by a proper value is fixed beforehand experimentally, and the mixer is stopped when the electric current reaches to the value fixed. Thus, a particulate mixture is obtained, which is then discharged into a feed hopper T2. This particulate mixture has an average particle diameter of from 1 to 15,000 $\mu$m, with the particularly preferred average particle diameter being in the range of from 10 to 4,000 $\mu$m from the standpoint of continuous automatic operation in the subsequent step. The blade rotational speed of the mixer Ml and the mixing time (electric current value) are fixed so as to obtain a particulate mixture having an average particle diameter in the above range.

The high-speed mixer Ml preferably employed in this invention is commercially available mixers such as a Henschel mixer and a microspeed mixer. In the case where such a mixer is used, a method may be employed, in which ingredients (A) and (B) only are first introduced into the measuring tank and into the mixer Ml and then mixed into a particulate mixture, before ingredient (C) which has been separately weighed is introduced into the mixer Ml through a feed opening attached thereto. Optional ingredients (additives for improving various properties) other than ingredients (A) to (C) may be mixed therewith in the mixer M1. However, if coloring pigments or the like are used, such pigments are preferably introduced later into a same-direction twin-screw extruder M2 through its feed opening, because they cause the soiling of the mixer.

In this invention, heating or cooling of the mixer M1 is not particularly required in the above mixing step. However, in order to obtain a uniform particulate mixture, it is preferred to maintain the temperature in the mixer M1 within a certain range. Although the temperature is selected from the range of from 10 to 100° C., preferred is around room temperature for the subsequent step, and in order to attain such a temperature, the mixer is in many cases cooled by passing water through the mixer.

Since the above-described first step in the process of this invention is conducted batch-wise, part or all of the apparatus for the first step may be multiplied double or more. If the first step is thus rationalized, the particulate mixture can be continuously supplied to the subsequent step and, as a result, the present process for the continuous production of a heat-vulcanizable silicone rubber compound can be practiced smoothly.

The free-flowing particulate silicone rubber mixture as obtained in the above first step is discharged into a mixture-feed hopper T2 for a same-direction twin-screw extruder M2. This feed hopper T2 is equipped with a scraper blade rotating at a speed of from 5 to 10 rpm to scrape the particulate mixture off the wall surfaces. By the scraper blade, the particulate mixture can be continuously discharged into a constant-rate belt feeder F1, which continuously supplies the particulate silicone rubber mixture to the same-direction twin-screw extruder M2 at a constant feed rate.

The same-direction twin-screw extruder M2 is an extruder having in its barrel two rotating screws arranged in parallel with each other, the two screws rotating in the same direction while synchronizing with each other. As a similar extruder, there are different-direction twin-screw extruders. However, extruders of this type are not recommended for use in this invention, because a silicone rubber compound in such an extruder undergoes local shearing around the tips of the screws so that uniform kneading cannot be conducted.

The extruder M2 employed in this invention may be an extruder having a screw speed up to 1,000 rpm. The screws of this extruder are not particularly limited in L/D ratio, i.e., the ratio of screw shaft length to screw diameter. However, it is preferred that the L/D ratio is in the range of from 25 to 50, from the standpoint of compound-kneading efficiency. Further, the construction and shape of the screws can be suitably selected from commercially available ones, but preferred is an extruder having double- to triple-threaded screws. Examples of such a same-direction twin-screw extruder are WP mixers manufactured by Werner & Pfleiderer KG, TEM mixers manufactured by Toshiba Machine Co., Ltd., Japan, and PCM mixers manufactured by Ikegai Seisakusho, Japan.

Preferred of these extruders are ones in which part or all of the barrel can be either cooled or heated. Further, an extruder whose barrel temperature can be regulated in a wide range of from 0 to 300° C. is advantageous in that it can be applied to various kinds of heat-vulcanizable silicone rubber compounds. The temperature regulation for these extruders is generally conducted by means of a jacket or an electric heater. Cooling is not necessarily required in the present invention, but in general, cooling of the extruder is conducted rapidly at the rear part of the barrel by means of a refrigerant carrier to remove the sensible heat resulting from the heating at the front part of the barrel or from heat generation due to the shearing. This rapid cooling is greatly advantageous because not only it makes the packing of the silicone rubber compound squeezed out of the extruder easy, but also the cooling has the effect of diminishing the plasticization reverse (crepe hardening) of the silicone rubber compound which has been heat-kneaded.

Also advantageously employed in this invention are an extruder in which its barrel has one or plural vent holes (low-pressure zone) at proper positions in the middle or end part of the barrel to remove volatile components or gases, and an extruder equipped with a second feed opening through which other ingredients that were not added in the preceding step can be added. It is preferred that the extruder has an extruding capacity balanced with the capacity of the apparatus for the first step. This can be easily achieved by suitably selecting the barrel bore and the screw rotational speed.

The particulate silicone rubber mixture which has been introduced into the above-described same-direction twin-screw extruder M2 is kneaded therein and, in a very short period of time, a silicone rubber compound having the same quality as that of the silicone rubber compounds obtained from conventional kneader compositions can be obtained through the discharge opening at the end of the extruder. In particular, in the case where untreated reinforcing silica is added as the inorganic filler (B) to the particulate silicone rubber mixture, heat-kneading and/or degassing is usually conducted in this second step. Also, in the above case, an organosilicon compound reactive to silanol groups on the surfaces of the silica, such as trimethylalkoxysilane, hexamethyldisilazane or 1,3-divinyltetramethyldisilazane, can be added to the mixture during the first step or through the feed opening of the extruder M2, so that the inorganic filler can be surface-treated in the extruder M2 while the mixture is heat-kneaded. By such heat-kneading in the extruder M2 in the second step, the resulting silicone rubber compound can be prevented from suffering crepe hardening for a long period of time and, at the same time, the surface treatment of the inorganic filler can be conducted. The temperature for the above heat-kneading is not particularly limited, but is usually suitably selected from the range of from 100 to 300° C.

As described above, it is highly probable that the second step will be a rate-determining step in the production of heat-vulcanizable silicone rubber compounds according to the invention. Therefore, a key point for increasing the efficiency of the whole process of this invention is to improve the power of the extruder M2. Specifically, the kneading in the second step should be conducted such that the time required in the second step (i.e., the time required for a particulate silicone rubber mixture to move from the feed opening to the discharge opening) is as short as from 1 to 60 minutes, preferably from 1 to 30 minutes.

According to the above-described process of the invention, heat-vulcanizable silicone rubber compounds of the same quality as that attained in prior art processes can be produced continuously and in a short period of time by the use of a combination of relatively smallsized machines and devices. In other words, heat-vulcanizable silicone rubber compounds can be obtained by the significantly shortened and greatly energy-saving process according to the invention. Therefore, the process of the present invention is considerably effective in the rationalization of the industrial production of heat-vulcanizable silicone rubber compounds.

The present invention will now be described in more detail by reference to the following Examples and Comparative Examples, but the Examples should not be construed to be limiting the scope of the invention. In the Examples and Comparative Examples, all parts are by weight.

EXAMPLE 1

Into a measuring tank T1 was introduced 21,000 parts of fumed silica (silica I) having a specific surface area of 300 m$^2$/g from an inorganic filler-feed pump P2. Thereto were added the following ingredients while they were weighed. That is, 50,000 parts of trimethylsilyl-terminated methylvinylpolysiloxane (gum I) consisting of 99.8 mol % of dimethylsiloxane units and 0.2 mol % of methylvinylsiloxane units and having a viscosity as measured at 25° C. of 15,000,000 cP was introduced into the tank T1 from a diorganopolysiloxane-feed pump P1 equipped at its discharge part with a grating and a rotating knife, while the methylvinylpolysiloxane was being formed into pellets having a diameter of 3 mm and a length of 5 mm, and 6,000 parts of a mixture composed of 3,000 parts of α,ω-dimethoxypolydimethylsiloxane (processing aid I) having a viscosity as measured at 25° C. of 15 cP and 3,000 parts of α,ω-dimethoxypolymethylphenylsiloxane (processing aid II) having a viscosity as measured at 25° C. of 30 cP and consisting of 67 mol % of dimethylsiloxane units and 33 mol % of diphenylsiloxane units was introduced as a processing aid into the tank T1 from a feed pump P3. The whole ingredients were transferred to a Henschel mixer (high-speed mixer M1) having a working capacity of 500 liters and a mixing blade radius of about 48 cm. The mixer was started up immediately, and operated at a speed of 800 rpm in order to apply powerful mechanical shearing forces to the contents. At the beginning of the operation, the value of the steady-state electric current which was fed to the mixer was read, and later, when the electric current reached to a value 1.5 times the value of the steady-state electric current, the operation was stopped, thereby obtaining a particulate mixture. The composition of this particulate mixture is shown in the Table below.

The thus-obtained particulate mixture was then discharged into a feed hopper T2 for particulate mixtures. The mixer M1 took 7 minutes from its start to the discharge, during which the mixer was kept cooled by passing water therethrough. The particulate mixture thus obtained had a temperature of 39° C. and was composed of flowable spherical particles having an average particle diameter of 60 μm. This particulate mixture was fed at a constant feed rate to a same-direction twin-screw extruder M2 by means of a constant-rate belt feeder F1. This extruder M2 was TEM-50 (trade name) manufactured by Toshiba Machine Co., Ltd., Japan and had a screw diameter (D) of 50 mm and a screw shaft length of 2,400 mm (L/D of the screw =48), with the screw speed being variable in the range of from 0 to 1,000 rpm. The barrel of this extruder had a feed opening for particulate mixtures in the part of L/D=1 to L/D=5, first and second open vent holes in the parts of L/D=20 to L/D=22 and L/D=36 to L/D=38, respectively, and a discharge opening for kneaded mixtures at the position of L/D=48. The vent holes could be connected with a vacuum pump for vacuum degassing, and the front vent hole could be a feed opening for other additives such as pigments. Furthermore, the heating and cooling system in the extruder was such that the L/D range of from 0 to 10 was able to be cooled with water, the L/D range of from 10 to 38 was able to be heated up to 300° C. with an electric heater, and the L/D range of from 38 to 48 was able to be rapidly cooled with a refrigerant carrier of −10° C.

The screw speed of the above extruder was regulated such that the particulate silicone rubber mixture was fed at a rate of 1,000 parts per minute. During the operation of the extruder, the barrel was heated such that the temperature of the compound in the part of L/D=36 to L/D=38 was maintained at 270° C, thereby removing low-boiling components and degassing under reduced pressure through the second vent hole, and the compound in the part of L/D=38 to L/D=48 was cooled with a refrigerant carrier of −10° C. The temperature of the silicone rubber compound when it was discharged from the extruder was about 90° C. The time required for this second step was 75 minutes.

The thus-obtained heat-vulcanizable silicone rubber compound was masticated with rolls. Part of the compound was used for the evaluation of plasticity just after the preparation of test samples and also after test samples were allowed to stand for 3 days and 3 months in accordance with the testing method for Williams plasticity as provided for in JIS C 2123. To the remainder of the silicone rubber compound was added 2,5-dimethyl-2,5-di-t-butylperoxyhexane in an amount of 0.3 part per 100 parts of the compound, and the resulting compound was press-vulcanized and then formed into a sheet having thickness of 2 mm. Subsequently, the sheet was subjected to post-vulcanization at 200° C. for 1 hour. The thus-obtained silicone rubber sheet was evaluated for some basic physical properties in accordance with JIS K 6301. The results obtained are shown in the Table below.

COMPARATIVE EXAMPLE 1

A silicone rubber compound having the same composition as that of the compound obtained in Example 1 was prepared using a 100-liter kneader. In preparing the silicone rubber compound, the mixture in the kneader was heat-kneaded at 150° C. for 4 hours after it had become uniform. Subsequently, the resulting mixture was cooled and then filtered with a single-screw extruder, thereby obtaining the desired silicone rubber compound. According to this method, the overall time required to complete the whole process beginning with the introduction of ingredients was 8 hours.

The thus-obtained silicone rubber compound was evaluated for plasticity and physical properties in the same manner as in Example 1. The results obtained are shown in the Table below.

Further, the dispersed state of the filler was examined by means of a microscope and compared with that in Example 1. As a result, no difference was found between them.

A comparison between the results of Example 1 and those of Comparative Example 1 shows that although the silicone rubber compound obtained in Example 1 is equal in property to that obtained in Comparative Example 1 using a kneader, the process of Example 1 is greatly superior to the comparative process in the time period required for the production.

COMPARATIVE EXAMPLE 2

500 Parts were taken out of the particulate mixture, in the feed hopper T2, obtained in the first step of Example 1, and then formed into a mass (compound) with rolls. Of the thus-obtained 500 parts of the compound, 100 parts were used to prepare test samples for the evaluation of plasticity in the same manner as in Example 1, and 300 parts were allowed to stand at room temperature to examine the change in plasticity with the lapse of time at an interval of every one month. A month later, plasticization of the compound was attempted with rolls but the result was the generation of microgels due to the pseudo-crosslinking (crepe hardening) which had been developed, and three months later, plasticization of the compound was no longer easy. Further, the remaining 100 parts were used to prepare substantially the same rubber sheet as that in Example 1 and its physical properties were evaluated. The results obtained are shown in the Table below.

The above results clearly show that the particulate mixture which has not undergone kneading in a same-direction twin-screw extruder is poor in storage stability and has a serious quality problem.

EXAMPLE 2

Into a Henschel mixer were introduced, in the same manner as in Example 1, 50,000 parts of the same gum I as used in Example 1, 25,000 parts of precipitated silica having a specific surface area of 210 m$^2$/g, 2,500 parts of α,ω-dihydroxypolydimethylsiloxane (processing aid III) having a viscosity as measured at 25° C. of 50 cP, and 40 parts of zinc stearate as an internal release agent. The mixer was operated at a speed of 800 rpm for 6 minutes, thereby obtaining a particulate mixture. The resulting particulate mixture was fed to the extruder M2 at a rate of 1,200 parts per minute by means of the constant-rate belt feeder F1. Kneading was conducted while the compound in the kneader was heated such that it finally had a temperature of 280° C. Both the first and second vent holes were used for vacuum degassing. Cooling of the rear part of the extruder was conducted in the same manner as in Example 1.

The thus-obtained silicone rubber compound was evaluated in the same manner as in Example 1, and the results obtained are shown in the Table below.

Further, the roll workability of this compound was examined, and it was found that its workability was equal or superior to that of the compounds obtained by conventional processes, so that the above-obtained compound was able to be formed into a 0.3-mm sheet by means of 8-inch rolls.

COMPARATIVE EXAMPLE 3

Using part of the particulate mixture obtained in Example 2, the same tests as in Comparative Example 2 were conducted. The silicone rubber compound thus obtained from the particulate mixture was able to be satisfactorily plasticized even after it had been allowed to stand at room temperature for 3 months. However, immediately after preparation, the compound showed an extremely high plasticity and was poor in flowability. The results of the evaluations of the plasticity and physical properties of this compound are shown in the Table below.

Further, the effect of aging on this compound was evaluated by measuring the plasticity and physical properties of the compound at an interval of every one month. As a result, it was found that the compound took about 3 months to exhibit properties almost equal to those of the compound obtained in Example 2. After a 3-month aging, the compound had a hardness of 54, a tensile strength of 63. kgf/cm$^2$ and an elongation of 320%, and these physical properties were almost equal to those of the compound obtained in Example 1. Moreover, the roll workability of the compound was evaluated. As a result, the adhesion of the compound to the roll surfaces was observed and it was difficult to form the compound into a 1-mm sheet by means of 8-inch rolls. Therefore, it was found that no effect was produced by the incorporation of the internal release agent if the compound was simply allowed to stand at room temperature.

COMPARATIVE EXAMPLE 4

Using the same raw materials as used in Example 1, preparation of a heat-vulcanizable silicone rubber compound was attempted by the method described below in which the raw materials were introduced into the same-direction twin-screw extruder without undergoing the first step. As a simple procedure, half of the same raw materials as used in Example 1 were introduced into a Henschel mixer, the mixer was operated for 30 seconds only to form an ununiform crude mixture, and this mixture was divided and placed into ten cans such that the ten were as the same in composition as possible. This crude mixture was fed to the extruder M2 under the same operation conditions as in Example 1. In the extruder M2, the kneading of the mixture was insufficient, so that the mixture remained in its particulate state until it reached to the first vent hole. Also, the compound discharged from the extruder utterly lacked a viscous nature and showed very poor roll workability. Further, several samples were taken out of the discharged compound to measure their specific gravities and, as a result, it was found that the measured specific gravity values varied widely and some values were outside the ±10% range based on the average. Therefore, the method in which heat-vulcanizable silicone rubber compounds are prepared by the use of a twin-screw extruder only cannot be employable at the present stage of techniques.

EXAMPLE 3

A silicone rubber compound was prepared in the same manner as in Example 1 except that the following raw materials were used; 50,000 parts of dimethylvinylsilyl-terminated organopolysiloxane (gum II) consisting of 94.8 mol % dimethylsiloxane units, 0.2 mol % methylvinylsiloxane units and 5 mol % diphenylsiloxane units and having a viscosity as measured at 25° C. of 18,000,000 cP, 20,000 parts of fumed silica 1 (silica II) having a specific surface area of 200 m$^2$/g, 500 parts of diatomaceous earth, 4,000 parts of the same processing aid I as used in Example 1 and, as a heat-resistance additives, 50 parts of ferrous dioctanoate.

The thus-obtained silicone rubber compound was evaluated for plasticity and physical properties, and the results obtained are shown in the Table below. Even after 6 months from the preparation, this compound exhibited good roll-retention properties and showed good roll workability which was equal to that just after the preparation.

EXAMPLE 4

A silicone rubber compound was prepared in the same manner as in Example 1 except that the following raw materials were used; 50,000 parts of trimethylsilyl-terminated organopolysiloxane (gum) consisting of 99.7 mol % 3,3,3-trifluoropropylmethylsiloxane units and 0.3 mol % methylvinylsiloxane units and having a viscosity as measured at 25° C. of 30,000,000 cP, 17,500 parts of fumed silica (silica III) having a specific surface area of 200 m²/g which had been surface-treated with 1,3-divinyltetramethyldisilazane, 10,000 parts of finely crushed quartz and 3,000 parts of the same processing aid II as used in Example 1. The thus-obtained silicone rubber compound was evaluated for plasticity and physical properties, and the results obtained are shown in the Table below.

The heat-vulcanizable silicone rubber compound obtained above also showed good long-term stability.

EXAMPLE 5

A particulate mixture was prepared in the same manner as in Example 1 from 50,000 parts of the same gum I as used in Example 1, 25,000 parts of the same silica II as used in Example 3, and 5,000 parts of the same processing aid III as used in Example 2. Using the thus-prepared particulate mixture, a heat-vulcanizable silicone rubber compound was obtained in the same manner as in Example 1 except for using, as a same-direction twin-screw extruder, a large-sized mixer, TEM-100 manufactured by Toshiba Machine Co., Ltd., Japan, which had the same structure as that of the extruder used in Example 1 but had a screw diameter of 100 mm. The feeding of the above-obtained particulate mixture was conducted at a rate of 3,000 parts per minute. The thus-obtained silicone rubber compound was subjected to the same tests as in Example 1, and the results obtained are shown in the Table below. The results of this Example show that silicone rubber compounds having satisfactorily good properties can be obtained even if a large-sized extruder was used, and production efficiency can be greatly improved by the use of such a large-sized extruder.

While the invention has been described in detail and with reference to specific embodiments thereof, it will be apparent to one skilled in the art that various changes and modifications can be made therein without departing from the spirit and scope thereof.

What is claimed is:

1. A process for continuously producing a heatvulcanizable silicone rubber compound which exhibits reduced plasticization reverse/crepe hardening which consists essentially of the steps of:
   (i) mixing (A) a diorganopolysiloxane having a viscosity as measured at 25° C. of $1 \times 10^5$ cP or more, (B) an inorganic filler and (C) a processing aid, as basic ingredients, by a high-speed mechanical shearing means, thereby to obtain a flowable particulate mixture which does not contain a vulcanizing agent and in which each ingredient is present in a substantially uniformly and finely dispersed state, and
   (ii) continuously feeding, at a constant feed rate, said particulate mixture to a continuously kneading and extruding machine through a feed opening thereof, which machine has two screws rotating in the same direction, thereby to obtain a homogeneous silicone rubber compound from a discharge opening of said kneading and extruding machine, wherein said flowable particulated mixture is kneaded in the continuously kneading and extruding machine while the mixture is heated at 100 to 300° C. and wherein cooling is conducted at the rear stage of the kneading step with the kneading and extruding machine, whereby the cooling diminishes the plasticization reverse/crepe hardening of the discharged silicone rubber compound.

2. A process according to claim 1, wherein said diorganopolysiloxane (A) has a viscosity of from $1 \times 10^6$ to $2 \times 10^8$ cP.

3. A process according to claim 1, wherein said diorganopolysiloxane is a substantially linear polymer represented by the formula $R^2(R^1{}_2SiO)_nSiR^1{}_2R^2$, wherein $R^1$ represents a substituted or unsubstituted monovalent hydrocarbon group, provided that 0 to 1.0% of the hydrocarbon groups of $R^1$ are vinyl; $R^2$ is a monovalent

TABLE

|  | Example | | | | | Comparative Example | | |
|---|---|---|---|---|---|---|---|---|
|  | 1 | 2 | 3 | 4 | 5 | 1 | 2 | 3 |
| Gum I | 50,000 | 50,000 |  |  | 50,000 | 50,000 | 50,000 | 50,000 |
| Gum II |  |  | 50,000 |  |  |  |  |  |
| Gum III |  |  |  | 50,000 |  |  |  |  |
| Silica I | 21,000 |  |  |  |  | 21,000 | 21,000 |  |
| Silica II |  |  | 20,000 |  | 25,000 |  |  |  |
| Silica III |  |  |  | 17,500 |  |  |  |  |
| Precipitated silica |  | 25,000 |  |  |  |  |  | 25,000 |
| Diatomaceous earth |  |  | 5,000 |  |  |  |  |  |
| Finely crushed quartz |  |  |  | 10,000 |  |  |  |  |
| Processing aid I | 3,000 |  | 4,000 |  |  | 3,000 | 3,000 |  |
| Processing aid II | 3,000 |  |  | 3,000 |  | 3,000 | 3,000 |  |
| Processing aid III |  | 2,500 |  |  | 5,000 |  |  | 2,500 |
| Zin stearate |  | 40 |  |  |  |  |  | 40 |
| Ion dioctanoate |  |  |  | 50 |  |  |  |  |
| Plasticity |  |  |  |  |  |  |  |  |
| Just after preparation | 242 | 253 | 230 | 290 | 268 | 240 | 410 | 491 |
| 3 Days later | 281 | 350 | 300 | 416 | 356 | 280 | 750 | 650 |
| 3 Months later | 245*[1] | 260*[1] | 236*[1] | 286*[1] | 270*[1] | 246*[1] | Unable to plasticize | 260*[1] |
| Properties |  |  |  |  |  |  |  |  |
| Hardness | 49 | 51 | 50 | 56 | 55 | 48 | 65 | 70 |
| Tensile strength (kgf/cm²) | 115 | 67 | 96 | 100 | 98 | 108 | 76 | 54 |
| Elongation (%) | 390 | 350 | 420 | 380 | 300 | 390 | 230 | 250 |

*Plasticity as measured just after the sample was plasticized 3 months after preparation.

group selected from the group consisting of a methyl group, a vinyl group, a phenyl group and a hyrdoxyl group; and n is in the range of from 1,000 to 10,000.

4. A process according to claim 1, wherein the amount of the inorganic filler (B) is in the range of from 10 to 200 parts by weight per 100 parts by weight of the organopolysiloxane (A).

5. A process according to claim 1, wherein the inorganic filler (B) is selected from the group consisting of a reinforcing silica, a surface-treated silica which has been treated with an organosilican compound selected from the group consisting of an organopolysiloxane, an organoalkoxysilane, an organochlorosilane and a hexaorganodisilazane, aluminum oxide, titanium oxide, iron oxide, cerium oxide, cerium hydroxide, magnesium oxide, zinc oxide, calcium carbonate, zirconium silicate, carbon black and ultramarine.

6. A process according to claim 5, wherein the inorganic filler (B) is selected from the group consisting of the reinforcing silica and the surface-treated silica and the reinforcing silica or surface-treated silica is added in an amount of 10 to 80 parts by weight per 100 parts by weight of the diorganopolysiloxane (A).

7. A process according to claim 1, wherein the processing aid (C) is selected from the group consisting of an organosilane, an organopolysiloxane having a viscosity at 25° C. in the range of from 1 to 300 cP and a silicone resin having a softening point of 150° C. or lower.

8. A process according to claim 7, wherein the processing aid (C) is added in an amount of from 0.1 to 30 parts by weight per 100 parts by weight of an diorganopolysiloxane (A).

9. A process according to claim 1, wherein said cooling is to a temperature below the temperature of 100 to 300° C. to which the mixture is heated.

10. A process according to claim 1, wherein said cooling is to a temperature of about 90° C. or less.

11. A process for continuously producing a heat-vulcanizable silicone rubber compound which exhibits reduced plasticization reverse/crepe hardening which consists essentially of the steps of:
  (i) mixing (A) a diorganopolysiloxane having a viscosity as measured at 25° C. of $1 \times 10^5$ cP or more, (B) an inorganic filler and (C) a processing aid, as basic ingredients, by a high-speed mechanical shearing means, thereby to obtain a flowable particulate mixture which does not contain a vulcanizing agent and in which each ingredient is present in a substantially uniformly and finely dispersed state, and
  (ii) continuously feeding, at a constant feed rate, said particulate mixture to a continuously kneading and extruding machine through a feed opening thereof, which machine has two screws rotating in the same direction, wherein the screws of said continuously kneading and extruding machine are double-threaded or triple-threaded screws, thereby to obtain a homogenous silicone rubber compound from a discharge opening of said kneading and extruding machine, wherein said flowable particulate mixture is kneaded in the continuously kneading and extruding machine while the mixture is heated at 100 to 300° C. and wherein cooling is conducted at the rear stage of the kneading step with the kneading and extruding machine, whereby the cooling diminishes the plasticization reverse/crepe hardening of the discharged silicone rubber compound.

12. A process according to claim 11, wherein said diorganopolysiloxane (A) has a viscosity of from $1 \times 10^6$ to $2 \times 10^8$ cP.

13. A process according to claim 11, wherein said diorganopolysiloxane is a substantially linear polymer represented by the formula $R^2(R^1_2SiO)_n SiR^1_2 R^2$, wherein $R^1$ represents a substituted or unsubstituted monovalent hydrocarbon group, provided that 0 to 1.0% of the hydrocarbon groups of $R^1$ are vinyl; $R^2$ is a monovalent group selected from the group consisting of a methyl group, a vinyl group, a phenyl group and a hydroxyl group; and n is in the range of from 1,000 to 10,000.

14. A process according to claim 11, wherein the amount of the inorganic filler (B) is in the range of from 10 to 200 parts by weight per 100 parts by weight of the organopolysiloxane (A).

15. A process according to claim 11, wherein the inorganic filler (B) is selected from the group consisting of a reinforcing silica, a surface-treated silica which has been treated with an organosilicon compound selected from the group consisting of an organopolysiloxane, an organoalkoxysilane, an organochlorosilane and a hexaorganodisilazane, aluminum oxide, titanium oxide, iron oxide, cerium oxide, cerium hydroxide, magnesium oxide, zinc oxide, calcium carbonate, zirconium silicate, carbon black and ultramarine.

16. A process according to claim 15, wherein the inorganic filler (B) is selected from the group consisting of the reinforcing silica and the surface-treated silica and the reinforcing silica or surface-treated silica is added in an amount of 10 to 80 parts by weight per 100 parts by weight of the diorganopolysiloxane (A).

17. A process according to claim 11, wherein the processing aid (C) is selected from the group consisting of an organosilane, an organopolysiloxane having a viscosity at 25° C. in the range of from 1 to 300 cP and a silicone resin having a softening point of 150° C. or lower.

18. A process according to claim 17, wherein the processing aid (C) is added in an amount of from 1.0 to 30 parts by weight per 100 parts by weight of the diorganopolysiloxane (A).

19. A process according to claim 11, wherein said cooling is to a temperature below the temperature of 100 to 300° C. to which the mixture is heated.

20. A process according to claim 11, wherein said cooling is to a temperature of about 90° C. or less.

21. A process for continuously producing a heat-vulcanizable silicone rubber compound which exhibits reduced plasticization reverse/crepe hardening which consists essentially of the steps of:
  (i) mixing (A) a diorganopolysiloxane having a viscosity as measured at 25° C. of $1 \times 10^5$ cP or more, (B) an inorganic filler and (C) a processing aid, as basic ingredients, by a high-speed mechanical shearing means, thereby to obtain a flowable particulate mixture which does not contain a vulcanizing agent and in which each ingredient is present in a substantially uniformly and finely dispersed state, and
  (ii) continuously feeding, at a constant feed rate, said particulate mixture to a continuously kneading and extruding machine through a feed opening thereof, which machine has two screws rotating in the same direction, wherein the screws of said continuously kneading and extruding machine are double-threaded or triple-threaded screws, thereby to obtain a homogeneous silicone rubber compound from a discharge opening of said kneading and extruding machine, wherein said flowable particulate mixture is kneaded in the continuously kneading and extruding machine while the mixture is heated at 100 to 300° C. and wherein cooling is conducted at the rear stage of the kneading step with the kneading and extruding machine, wherein said diorganopolysiloxane (A) is formed into pellets by means of a rotary chopper provided at the discharge opening of a feed pump for said diorganopolysiloxane (A), before said diorganopolysiloxane (A) is mixed with the ingredients (B) and (C) to form the flowable particulate mixture, whereby the cooing diminishes the plasticization reverse/crepe hardening of the discharged silicone rubber compound.

22. A process according to claim 21, wherein said diorganopolysiloxane (A) has a viscosity of from $1 \times 10^6$ to $2 \times 10^8$ cP.

23. A process according to claim 21, wherein said diorganopolysiloxane is a substantially linear polymer represented by the formula $R^2(R^1{}_2SiO)_nSiR^1{}_2R^2$, wherein $R^1$ represents a substituted or unsubstituted monovalent hydrocarbon group, providing that 0 to 1.0% of the hydrocarbon groups of $R^1$ are vinyl; $R^2$ is a monovalent group selected from the group consisting of a methyl group, a vinyl group, a phenyl group and a hydroxyl group; and n is in the range of from 1,000 to 10,000.

24. A process according to claim 21, wherein the amount of the inorganic filler (B) is in the range of from 10 to 200 parts by weight per 100 parts by weight of the organopolysiloxane (A).

25. A process according to claim 21, wherein the inorganic filler (B) is selected from the group consisting of a reinforcing silica, a surface-treated silica which has been treated with an organosilican compound selected from the group consisting of an organopolysiloxane, an organoalkoxysilane, an organochlorosilane and a hexaorganodisilazane, aluminum oxide, titanium oxide, iron oxide, cerium oxide, cerium hydroxide, magnesium oxide, zinc oxide, calcium carbonate, zirconium silicate, carbon black and ultramarine.

26. A process according to claim 25, wherein the inorganic filler (B) is selected from the group consisting of the reinforcing silica and the surface-treated silica and the reinforcing silica or surface-treated silica is added in an amount of 10 to 80 parts by weight per 100 parts by weight of the diorganopolysiloxane (A).

27. A process according to claim 21, wherein the processing aid (C) is selected from the group consisting of an organosilane, an organopolysiloxane having a viscosity at 25° C. in the range of from 1 to 300 cP and a silicone resin having a softening point of 150° C. or lower.

28. A process according to claim 27, wherein the processing aid (C) is added in an amount of from 0.1 to 30 parts by weight per 100 parts by weight of the diorganopolysiloxane (A).

29. A process according to claim 21, wherein said cooling is to a temperature below the temperature of 100 to 300° C. to which the mixture is heated.

30. A process according to claim 21, wherein said cooling is to a temperature of about 90° C. or less.

* * * * *